July 14, 1959     J. HORSELING     2,894,529
DEGASIFYING DEVICE
Filed Dec. 30, 1954
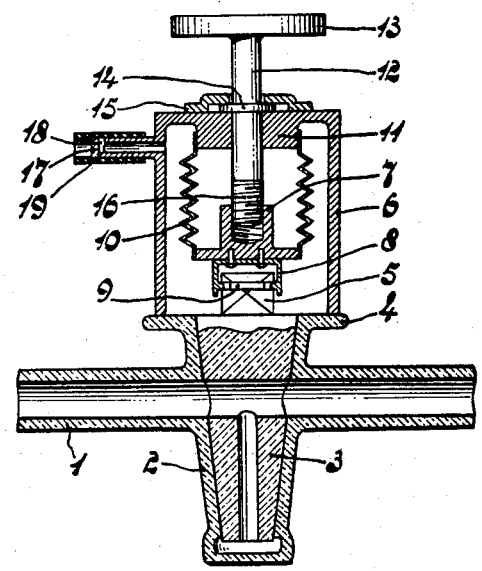
INVENTOR
JAN HORSELING
AGENT

United States Patent Office 2,894,529
Patented July 14, 1959

2,894,529

DEGASIFYING DEVICE

Jan Horseling, Emmasingel, Eindhoven, Netherlands, assignor, by mesne assignments, to North American Philips Company, Inc., New York, N.Y., a corporation of Delaware Application December 30, 1954, Serial No. 478,779

Claims priority, application Netherlands February 18, 1954

3 Claims. (Cl. 137—315)

The present invention relates to a plug cock degasifying device. More particularly, the invention relates to a device for use in degasifying plug cocks comprised in a system, said cocks comprising a housing and a plug rotatable in said housing and freely detachable from said housing, said system being required to have a high vacuum during operation.

In practice it has been found that degasifying of such a plug cock gives rise to difficulties. As a rule, a small quantity of lubricant and/or stuffing agent is used between the housing and the plug and it is principally this layer, which is naturally very thin, which causes the degasification to require extraordinarily much time. It is desirable to perform the degasification within the shortest possible time, especially in systems such as neutron generators, electron microscopes and the like, which require a rapid degasification with respect to the short time they are permitted to be out of operation. In other systems too, it may be required to attain an optimum vacuum within a short time.

The invention relates to a device, by which the degasifying time, as far as the plug cocks are concerned, can be reduced considerably. In accordance with the invention, the device comprises means by which, during the degasifying, the position of the plug relative to the housing can be varied in a manner such that the space between the wall of the housing and the plug is increased, these means being housed in a body occupying a small space relative to the system, which space is closed from the open air when the position of the plug is varied. Control members, if provided, and taken through the walls of the body, are not provided with stuffing means against said walls. The device thus permits the lifting of the plug out of the housing during degasification, while the difficulties of taking a control-member through the wall in a gas-tight manner prior to the lifting of the plug, are avoided.

According to one aspect of the invention, the device is preferably detachable from the housing, so that, for example, subsequent to evacuation the device may be removed and a normal control-member can be put on the plug.

According to a further aspect of the invention, the housing has a stuffing surface approximately at right angles to the center line of the plug and the device has a corresponding surface; for the degasification these surfaces are joined and held against one another only by atmospheric pressure; these surfaces close the device from the open air, with the use of a stuffing agent, if necessary.

According to a further aspect of the invention, the device preferably comprises a unilaterally closed, cylindrical body, having a central spindle provided with screw thread at the one end and taken through the closed end of the cylindrical body so as to be rotatable. The cylindrical body comprises a movable cylindrical member which is gripped by one end of a gas-tight bellows, of which the other end is secured in a gas-tight manner to the closed end of the cylindrical body. The movable cylindrical member may be moved axially by means of the screw spindle; at the end remote from the bellows said member is provided with means which can engage an extension provided on the plug, means being furthermore provided to cause the interior of the cylindrical body to communicate with the open air.

In order that the invention may be readily carried into effect, it will now be described more fully with reference to the accompanying drawing, wherein the single figure is a sectional view of an embodiment of a plug cock and a device provided thereon which permits the lifting of the plug out of the housing during degasification.

Reference numeral 1 designates a glass duct comprising a glass plug cock housing 2 with a glass plug 3. The housing 2 is provided with a flange 4 and the plug 3 has a square 5 on which a key for turning said plug may be affixed. A cylindrical metal body 6 is placed on the flange 4; between the end surface of the body 6 and the flange 4 provision is made, if necessary, of a small quantity of stuffing agent, for example fat or a rubber ring. The body 6 includes a circular member 7 to which a resilient fork 8 is secured, which engages a groove 9 provided in the square 5. The member 7 is secured to one end of gas-tight bellows 10, of which the other end is secured in a gas-tight manner to an extension 11 provided on the closed end of the body 6. A screw spindle 12, provided with a knob 13, has a collar 14 which is held between a lock 15 secured to the cylindrical body 6 and the top surface of said body. At the end remote from the knob 13, the screw spindle 12 is provided with a screw thread 16, which cooperates with a screw thread in an aperture in the member 7. Finally, the body 6 is provided with a partly bored stub 17, the bore of which communicates with the open air through an aperture 18. The aperture 18 is closed, as shown, by a piece of rubber tube 19.

If the system, of which the duct 1 and the plug cock 2, 3 form part, is to be degasified, the body 6 is placed on the flange 4, if necessary with the interposition of a small quantity of fat or of a rubber ring. Turning of the knob 13 causes the plug 3 to be lifted slightly, after which the desgasification is started. Due to the lifting of the plug 3, the degasification of the walls of the housing 2, the plug 3 and the stuffing agent, if any, provided between them, is performed much more rapidly and in an improved manner. The entire device is urged against the flange 4 by the atmospheric pressure and due to the bellows 10 no air can penetrate into the interior of the body 6, so that it is not necessary to stuff the throughconnection of the spindle 12 through said body 6. When the degasification of the system has become sufficient, the plug 3 is re-introduced into the housing 2 by the turning of the spindle 12. Then the piece of rubber tube 19 is removed from the stub 17, so that air can penetrate into the interior of the body 6. Thus the device can be lifted from the flange 4, since the resilient body 8 readily disengages the groove 9, the plug 3 remaining in its position.

The device may, as an alternative, be secured rigidly to the cock housing 2; the connection between the member 7 and the plug 3 must then be such that said plug can be controlled. However, as a further alternative, use, may be made of a unilaterally closed body 6; the movement of the plug 3, as far as the lifting is concerned, being performed magnetically. The plug may also be turned by magnetic means.

While the invention has been described by means of a specific example and in a specific embodiment, I do not wish to be limited thereto, for obvious modifications will occur to those skilled in the art without departing from the spirit and scope of the invention.

What is claimed is:

1. A degasifying device including a plug cock, comprising a housing having an open end, said housing having a flow passage therethrough and a tapered bore intersecting said passage and opening to the exterior of said housing through said open end, a plug having a flow passage therethrough, said plug being shaped to seat in said bore and rotatable selectively to flow enabling and preventing positions, enclosing means cooperable with said open end of said housing to cover the opening of said bore, said enclosing means being releasably secured to said housing by atmospheric pressure on the exterior thereof when the interior thereof is evacuated through said flow passage, and means for axially moving said plug and for rotating said plug while said enclosing means is secured to said housing thereby to provide communication between said flow passage of the said housing and said enclosing means.

2. A degasifying device including a plug cock, comprising a housing provided with a flanged portion, said housing having a flow passage therethrough and a tapered bore intersecting said passage and opening to the exterior of said housing through said flanged portion, a plug having a flow passage therethrough, said plug being shaped to seat in said bore and rotatable selectively to flow enabling and preventing positions, enclosing means co-operable with said flange to cover the opening of said bore, a stub communicating with the interior of said enclosing means, said enclosing means being releasably secured to said flange by atmospheric pressure on the exterior thereof when the interior thereof is evacuated through said flow passage of said housing, and means for axially moving said plug and for rotating said plug while said enclosing means is secured to said flange thereby to provide communication between said flow passage of said housing and said enclosing means.

3. A degasifying device including a plug cock, comprising a housing provided with a flanged portion, said housing having a flow passage therethrough and a tapered bore intersecting said passage and opening to the exterior of said housing through said flanged portion, a plug having a flow passage therethrough, said plug being shaped to seat in said bore and rotatable selectively to flow enabling and preventing positions, enclosing means co-operable with said flange to cover the opening of said bore, a stub communicating with the interior of said enclosing means, said enclosing means being releasably secured to said flange by atmospheric pressure on the exterior thereof when the interior thereof is evacuated through said flow passage, and means for axially moving said plug while said enclosing means is secured to the flange thereby to provide communication between said flow passage of said housing and said enclosing means, said last-mentioned means comprising a bellows secured to said enclosing means, a spindle having a screw thread at one end, means for rotatably mounting said spindle in said bellows in a manner whereby the other end of said spindle extends through said enclosing means, an actuating member in threaded engagement with said screw thread of said spindle and adapted to be moved by rotation of the said spindle, said actuating member being affixed to said bellows in a manner whereby rotation of said spindle produces axial movement of said bellows, and means coupling said actuating member to said plug.

References Cited in the file of this patent

UNITED STATES PATENTS

| | | |
|---|---|---|
| 1,003,068 | Schaller | Sept. 12, 1911 |
| 1,493,253 | Eggleston | May 6, 1924 |
| 2,171,937 | Larry | Sept. 5, 1939 |
| 2,640,492 | Sawicki | June 2, 1953 |
| 2,662,722 | Graziano | Dec. 15, 1953 |
| 2,706,997 | Moody | Apr. 26, 1955 |